(12) United States Patent
Karoji

(10) Patent No.: US 9,767,069 B2
(45) Date of Patent: Sep. 19, 2017

(54) FORMULA DISPLAY CONTROL DEVICE, FORMULA DISPLAY METHOD, AND RECORDING MEDIUM STORING PROGRAM

(71) Applicant: CASIO COMPUTER CO., LTD., Shibuya-ku, Tokyo (JP)

(72) Inventor: Kosuke Karoji, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 362 days.

(21) Appl. No.: 14/490,545

(22) Filed: Sep. 18, 2014

(65) Prior Publication Data
US 2015/0081750 A1    Mar. 19, 2015

(30) Foreign Application Priority Data

Sep. 19, 2013 (JP) .................... 2013-194650

(51) Int. Cl.
*G06F 15/02* (2006.01)
(52) U.S. Cl.
CPC .................... *G06F 15/02* (2013.01)
(58) Field of Classification Search
None
See application file for complete search history.

(56) References Cited

U.S. PATENT DOCUMENTS

| | | | |
|---|---|---|---|
| 2004/0227738 A1 | 11/2004 | Sudoh | |
| 2006/0069705 A1* | 3/2006 | Satoh | G06F 3/0236 708/131 |
| 2007/0046674 A1 | 3/2007 | Sudoh | |
| 2009/0177722 A1* | 7/2009 | Midorogi | G06F 15/02 708/130 |
| 2009/0240751 A1* | 9/2009 | Renshaw | G06F 15/0258 708/131 |

(Continued)

FOREIGN PATENT DOCUMENTS

| | | |
|---|---|---|
| EP | 2423849 A2 | 2/2012 |
| JP | 01108670 A | 4/1989 |
| JP | 06119313 A | 4/1994 |

(Continued)

OTHER PUBLICATIONS

Extended European Search Report dated Feb. 11, 2015, issued in counterpart European Application No. 14185335.8.

(Continued)

*Primary Examiner* — Michael D Yaary
(74) *Attorney, Agent, or Firm* — Holtz, Holtz & Volek PC

(57) ABSTRACT

A formula display control device includes a display unit, a text display control unit, a formula designation unit, a template formula generation unit and a template formula display control unit. The text display control unit displays text including a formula on the display unit. The formula designation unit designates the formula in the text displayed on the display unit in response to a user operation. The template formula generation unit replaces a coefficient portion in the formula with an input frame to generate a template formula when a coefficient is included in the designated formula. The template formula display control unit displays the template formula generated by the template formula generation unit as text which is displayed on the display unit.

18 Claims, 13 Drawing Sheets

(56) References Cited

U.S. PATENT DOCUMENTS

2012/0050328 A1   3/2012   Karoji

FOREIGN PATENT DOCUMENTS

| | | |
|---|---|---|
| JP | 2004126684 A | 4/2004 |
| JP | 2006004326 A | 1/2006 |
| JP | 2011175400 A | 9/2011 |
| JP | 2013030146 A | 2/2013 |
| JP | 2013073427 A | 4/2013 |
| KR | 1020100000150 A | 1/2010 |

OTHER PUBLICATIONS

University of Reading IT Services: "Microsoft Word 2010 (TM) Equations (Level 3)", Dec. 2011, pp. 1-8, XP002735269, Retrieved from the Internet: http://www.reading.ac.uk/web/FILES/its/Equations2010.pdf.
Javaid, "Add Math Equations With Word 2010 Equation Editor", Addictive Tips, Mar. 19, 2010, pp. 1-7, XP002735268, Retrieved from the Internet: http://www.addictivetips.com/microsoft-office/add-math-equations-with-word-2010-equation-editor.
Japanese Office Action (and English translation thereof) dated Jul. 4, 2017 issued in counterpart Japanese Application No. 2013-194650.

* cited by examiner

| LETTER AND FRAME COLOR DATA | | | | |
|---|---|---|---|---|
| 1 | a  α  m | RED | |
| 2 | b  β  n | BLUE | |
| 3 | c  γ  p | YELLOWISH GREEN | |
| 4 | d     q | YELLOW | |
| 5 | e     i | PINK | |
| 6 | f     j | SKY BLUE | |
| 7 | g    k | PURPLE | |

12e

United States Patent US 9,767,069 B2

FORMULA DISPLAY CONTROL DEVICE, FORMULA DISPLAY METHOD, AND RECORDING MEDIUM STORING PROGRAM

CROSS-REFERENCE TO RELATED APPLICATION

This application claims priority based on Japanese Patent Application No. 2013-194650, filed on Sep. 19, 2013, the entire contents of which are incorporated by reference herein.

BACKGROUND OF THE INVENTION

1. Technical Field

The invention relates to a formula display control device, a formula display method, and a recording medium storing a control program.

2. Description of the Related Art

Electronic calculators according to the related art, such as scientific calculators, have a function of copying an arbitrary formula which is input and displayed on a display unit and pasting the copied formula.

As the scientific calculator according to the related art, a formula input device has been proposed which stores a formula portion forming the displayed formula so as to be associated with an identification color for identifying the formula portion, reads a formula portion corresponding to a selected identification color when the user selects any one of the identification colors, and displays the formula portion in the identification color (for example, JP-A-2011-175400).

According to this structure, it is possible to selectively copy and paste a plurality of formula portions with ease.

The formula input device of the related art copies and pastes the previously used formula, the input formula, or a formula portion of the formula and uses the copied and pasted formula or formula portion. However, when the pasted formula or formula portion is used, similar formulas with different numerical values are generally used.

Therefore, the user needs to selectively delete various parameter portions included in the copied and pasted formula if necessary and to input desired numerical values.

SUMMARY OF THE INVENTION

The invention has been made in view of the above-mentioned problems and an object of the invention is to provide a formula display control device that can simply and effectively use a copied formula.

In order to solve the above-mentioned problems, according to the invention, a formula display control device includes a display unit, a text display control unit, a formula designation unit, a template formula generation unit and a template formula display control unit. The text display control unit displays text including a formula on the display unit. The formula designation unit designates the formula in the text displayed on the display unit in response to an operation of a user. The template formula generation unit replaces a coefficient portion in the formula with an input frame to generate a template formula when a coefficient is included in the designated formula. The template formula display control unit displays the template formula generated by the template formula generation unit as text which is displayed on the display unit, in response to an operation of the user.

DETAILED DESCRIPTION OF THE INVENTION

Hereinafter, embodiments of the invention will be described with reference to the drawings.

Figure 1:
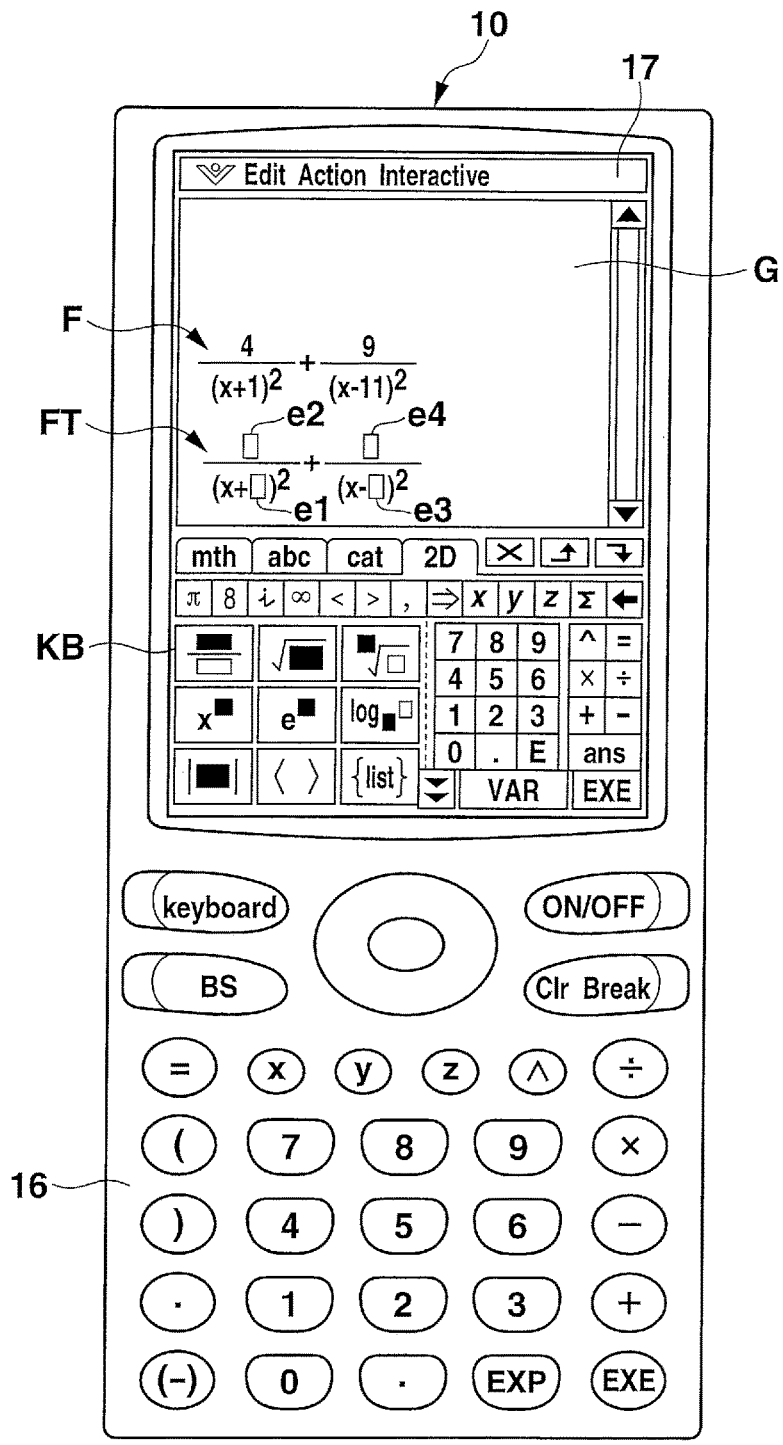
FIG. 1 is a front view illustrating the outward appearance of a scientific calculator 10 according to an embodiment of a formula display control device of the invention.

FIG. 1 is a front view illustrating the outward appearance of a scientific calculator 10 according to an embodiment of a formula display control device of the invention.

The formula display control device is, for example, a portable device only for calculation (scientific calculator 10), which will be described below, or a touch-panel-type personal digital assistant (PDA), a personal computer (PC), a mobile phone, an electronic book, or a portable game machine having a formula processing function.

The scientific calculator 10 includes a body case with a sufficient size to be held by one hand of a user, a key input unit 16 which is provided in the lower half region of the front surface and includes numeric keys, arithmetic keys, symbol keys, and various functional keys, and a touch-panel-type color display unit 17 which is provided in the upper half region.

Figure 2:
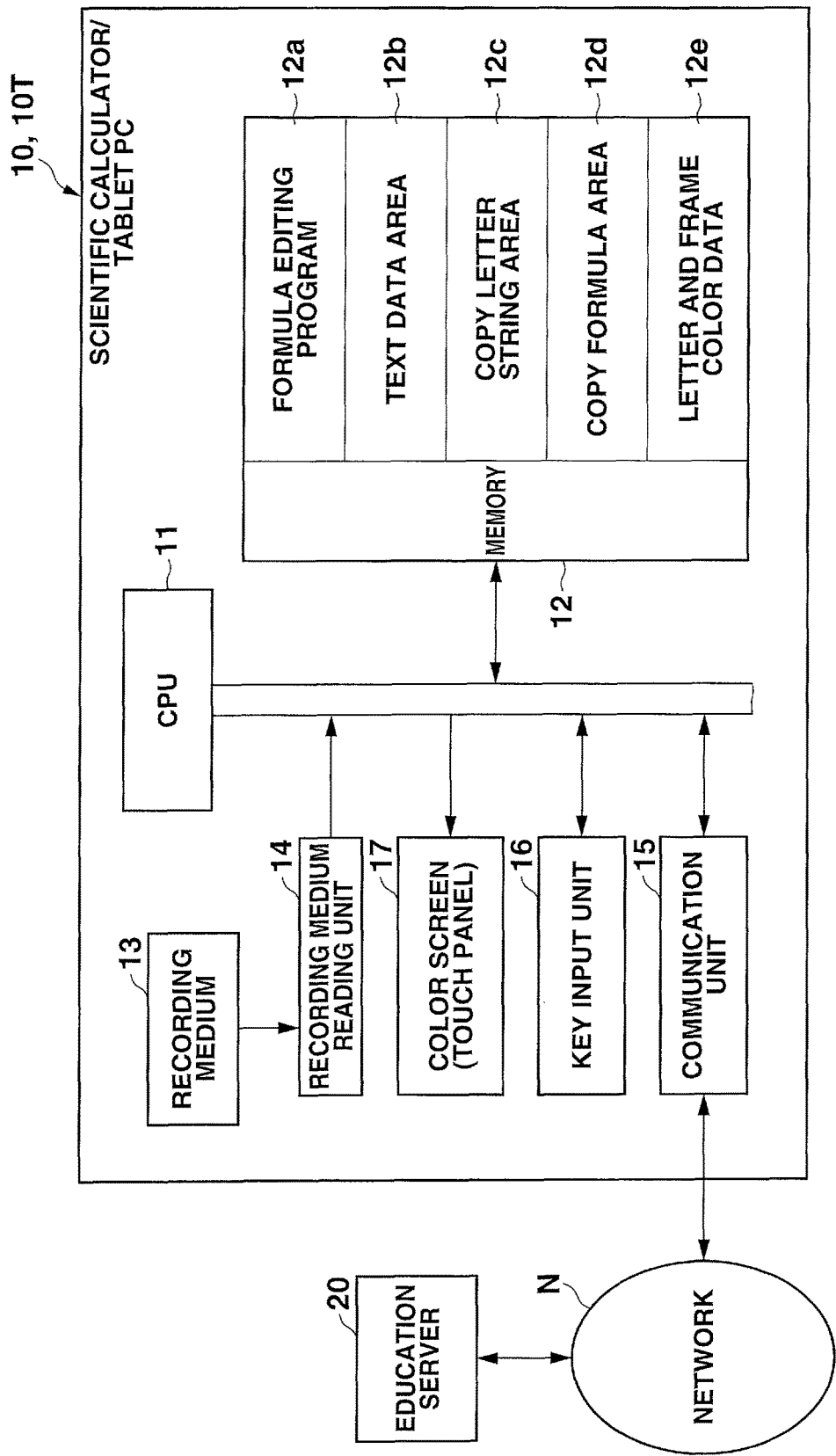
FIG. 2 is a block diagram illustrating the structure of an electronic circuit of the scientific calculator 10.

FIG. 2 is a block diagram illustrating the electronic circuit structure of the scientific calculator 10. The electronic circuit of the scientific calculator 10 includes a CPU 11 which is a computer. The CPU 11 controls the operation of each unit of the circuit, using a memory 12 as a work area, according to a calculator control program that is stored in the memory 12 in advance, a calculator control program that is read from an external recording medium 13, such as a memory card, to the memory 12 through a recording medium reading unit 14, or a calculator control program that is read from a web server (here, an education server) 20 on a communication network N to the memory 12 through a communication unit 15.

The calculator control programs stored in the memory 12 include a calculation program for performing various calculation processes including formula processing, and table processing, a communication program for communicating with various types of external electronic apparatuses through the communication unit 15, and a formula editing program 12a for copying, pasting, editing, and using formulas used in, for example, the calculation process.

The calculator control program starts in response to a key input signal that is input from the key input unit 16 by an operation of the user, a touch input signal that is input from the touch-panel-type color display unit 17 by an operation of the user, or a communication signal that is received from the outside through the communication unit 15.

As storage areas for various kinds of work, for example, a text data area 12b, a copy letter string area 12c, a copy formula area 12d, and a letter and frame color data table 12d are ensured in the memory 12.

The text data area 12b stores text data including letters or formulas that are input and displayed on the display unit 17.

The copy letter string area 12c functions as a copy buffer. The copy letter string area 12c stores data for a range which is designated as a copy target in the text data that is input and displayed on the display unit 17.

Only the formula included in the text data which is copied and stored in the copy letter string area 12c is extracted and stored in the copy formula area 12d.

Figures 3, 4:
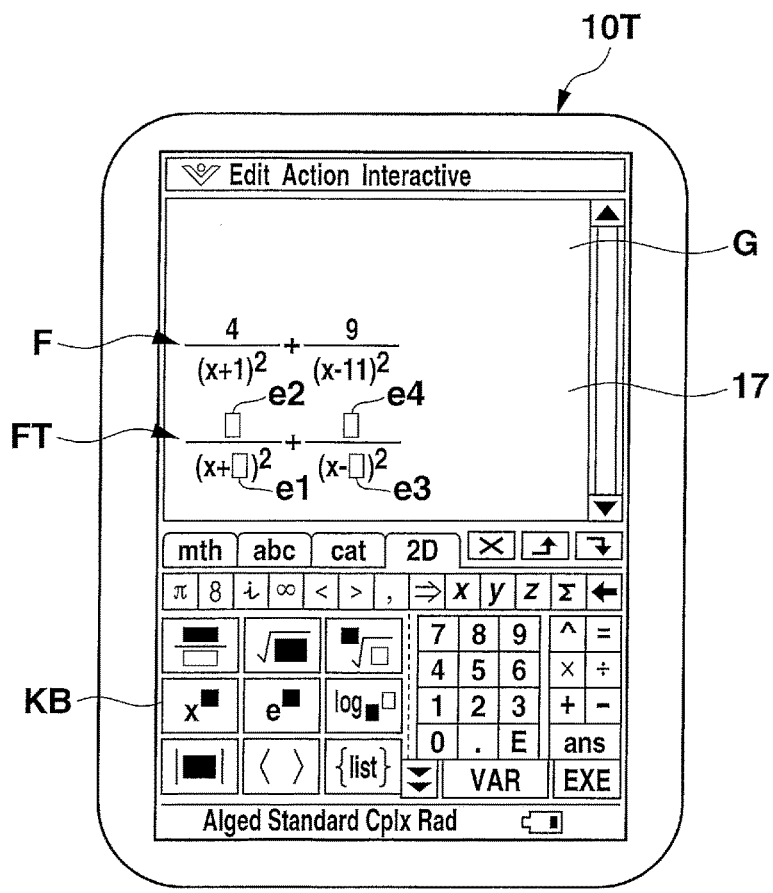
FIG. 3 is a diagram illustrating the content of a letter and frame color data table 12d stored in a memory 12 of the scientific calculator 10.
FIG. 4 is a front view illustrating the outward appearance of a tablet PC 10T according to another embodiment of the numerical value display control device of the invention.

FIG. 3 is a diagram illustrating the content of the letter and frame color data table 12d which is stored in the memory 12 of the scientific calculator 10.

The letter and frame color data table 12d stores letters of the alphabet or the like used as symbols of coefficients or arguments in various formulas, so as to be associated with different identification colors. Specifically, when a copied formula is pasted as a template (Math-Template Paste) according to a formula editing process, which will be described below, a numerical value input frame which is replaced from the letter in the formula is displayed in an identification color corresponding to the letter before the replacement, on the basis of the letter and frame color data table 12d.

In the drawings of the invention, since the expression of colors is limited to a black-and-white expression, colors other than black and white are expressed such that a colored portion has a pattern, such as a hatching pattern, corresponding to the color and the name of the color is described.

As such, the memory 12, the recording medium reading unit 14, the communication unit 15, the key input unit 16, and the touch-panel-type color display unit 17 are connected to the CPU 11.

The scientific calculator 10 has the following functions: a function that copies a formula F displayed on a formula display screen G of the touch-panel-type color display unit 17; a function that generates a template formula FT obtained by replacing a letter portion with a numerical value input frame e and a template formula FT obtained by replacing a numerical value portion with the numerical value input frame e, for a coefficient portion and an argument portion in a copied formula F, and pastes a list of the template formulas to a window (Math-Template Paste); a function that displays the numerical value input frame e which is replaced from the letter portion in the pasted template formula FT in an identification color corresponding to the letter; and a function that, when a plurality of numerical value input frames e have the same identification color corresponding to the letter in the displayed template formula FT, collectively inputs the same numerical value as that input to one of the numerical value input frames e to the other numerical value input frames e.

In the scientific calculator 10 having the above-mentioned structure, the CPU 11 controls the operation of each unit of the circuit in response to commands described in the calculator control program (12a) and software and hardware operate in cooperation with each other to implement a formula editing function, to be described in the following expression of the operation.

A case in which the embodiment of the numerical value display control device is achieved by the scientific calculator 10 has been described. However, for example, as shown in FIG. 4, the embodiment may be achieved by performing the input and display operations corresponding to each process of the formula editing process program 12a using the touch-panel-type color display unit 17 in a tablet PC 10T.

FIG. 4 is a front view illustrating the outward appearance of the tablet PC 10T according to another embodiment of the numerical value display control device of the invention.

FIG. 4 shows a display operation associated with a formula editing process when a formula F which is input by the user or is read from a memory and is then displayed is copied and pasted as a template formula FT (Math-Template Paste) on a touch-panel-type color display unit 17 of the tablet PC 10T.

Here, FIG. 4 shows a case in which values "1", "4", "11", and "9" in an argument portion of a formula F are respectively replaced with numerical value input frames e1, e2, e3, and e4 to generate a template formula FT.

Next, the operation of the scientific calculator 10 having the above-mentioned formula editing function will be described.

Figure 5:
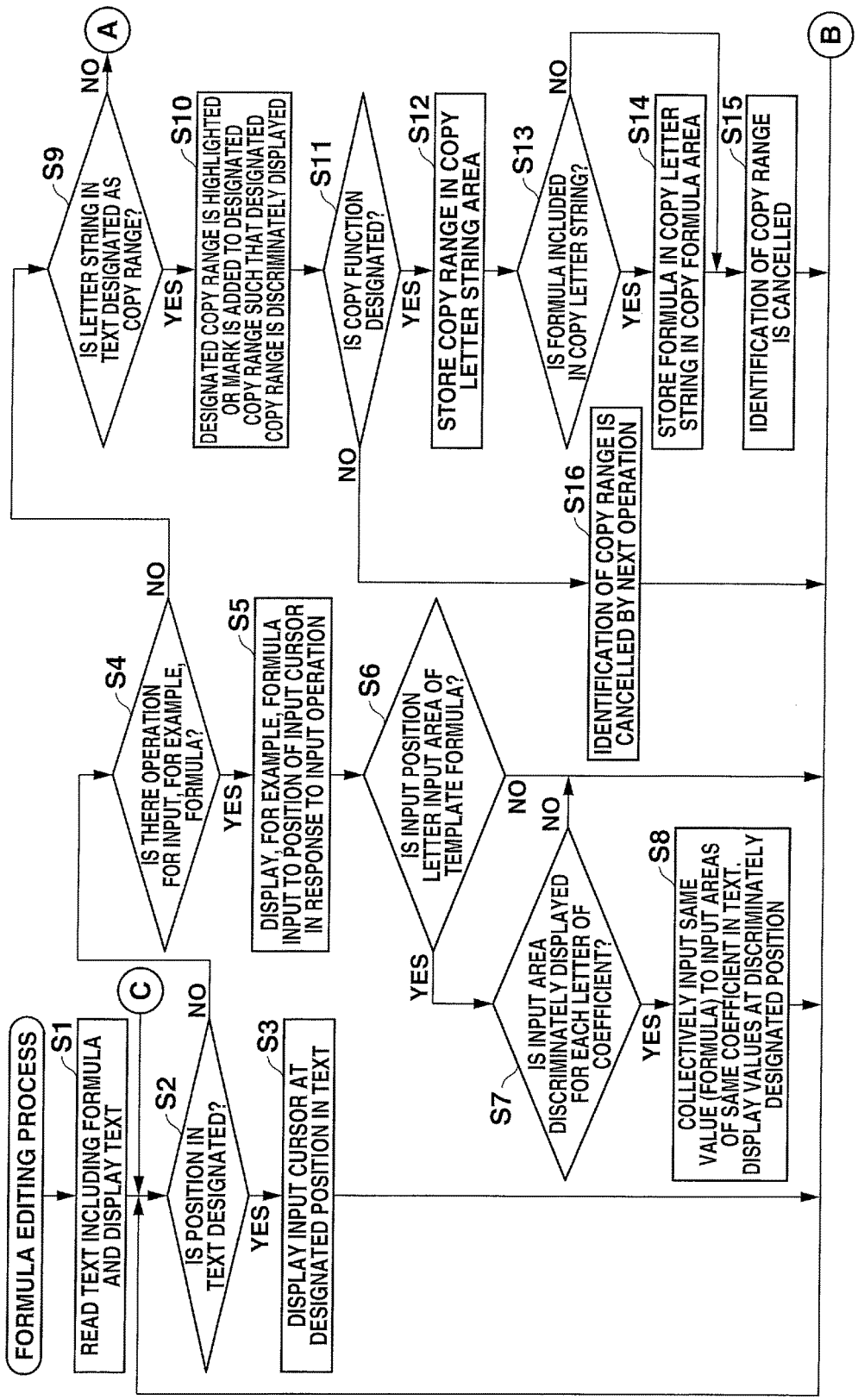
FIG. 5 is a flowchart illustrating a formula editing process (part 1) of the scientific calculator 10.

FIG. 5 is a flowchart illustrating the formula editing process (part 1) of the scientific calculator 10.

Figure 6:
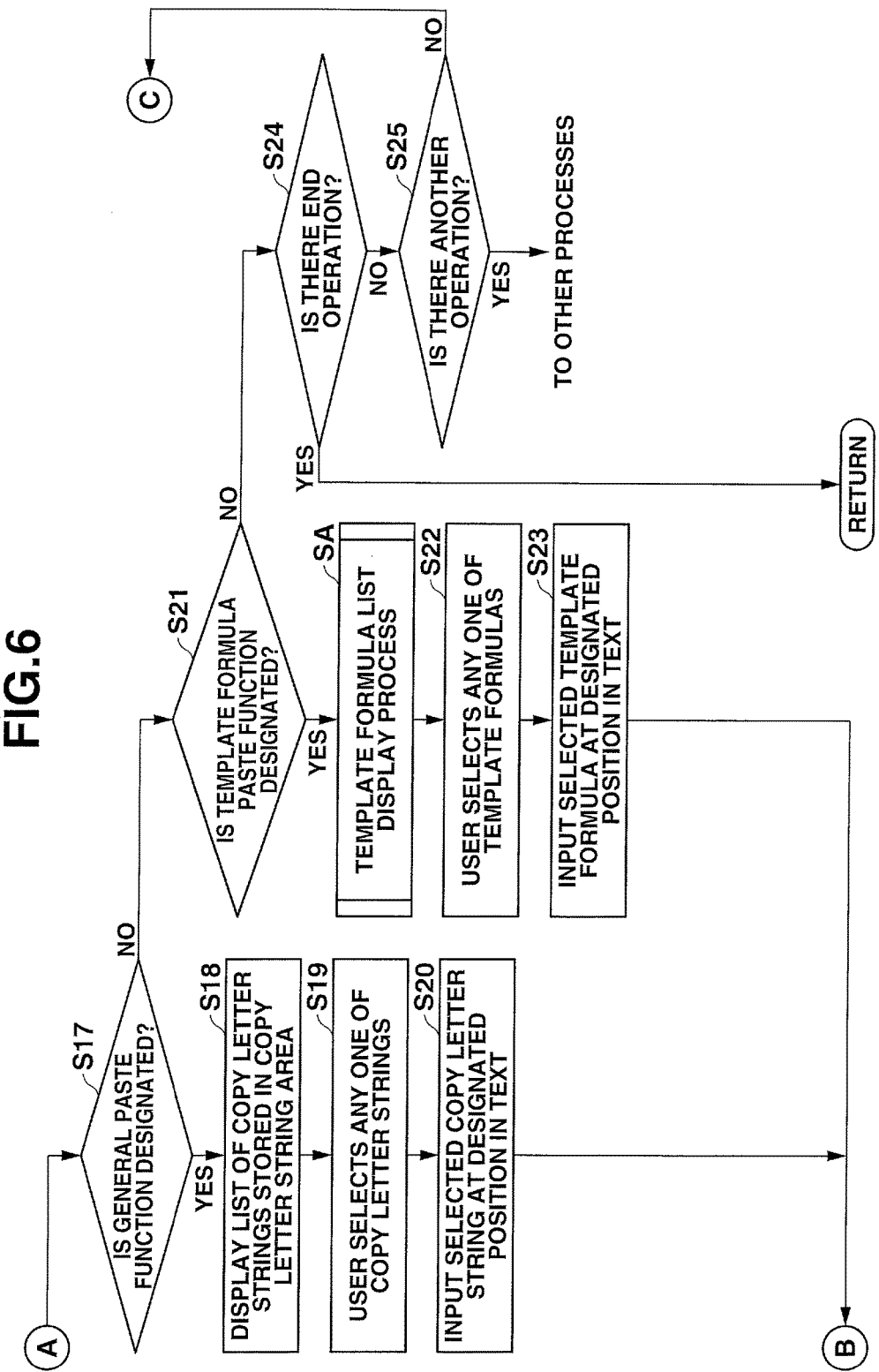
FIG. 6 is a flowchart illustrating the formula editing process (part 2) of the scientific calculator 10.

FIG. 6 is a flowchart illustrating the formula editing process (part 2) of the scientific calculator 10.

Figure 7:
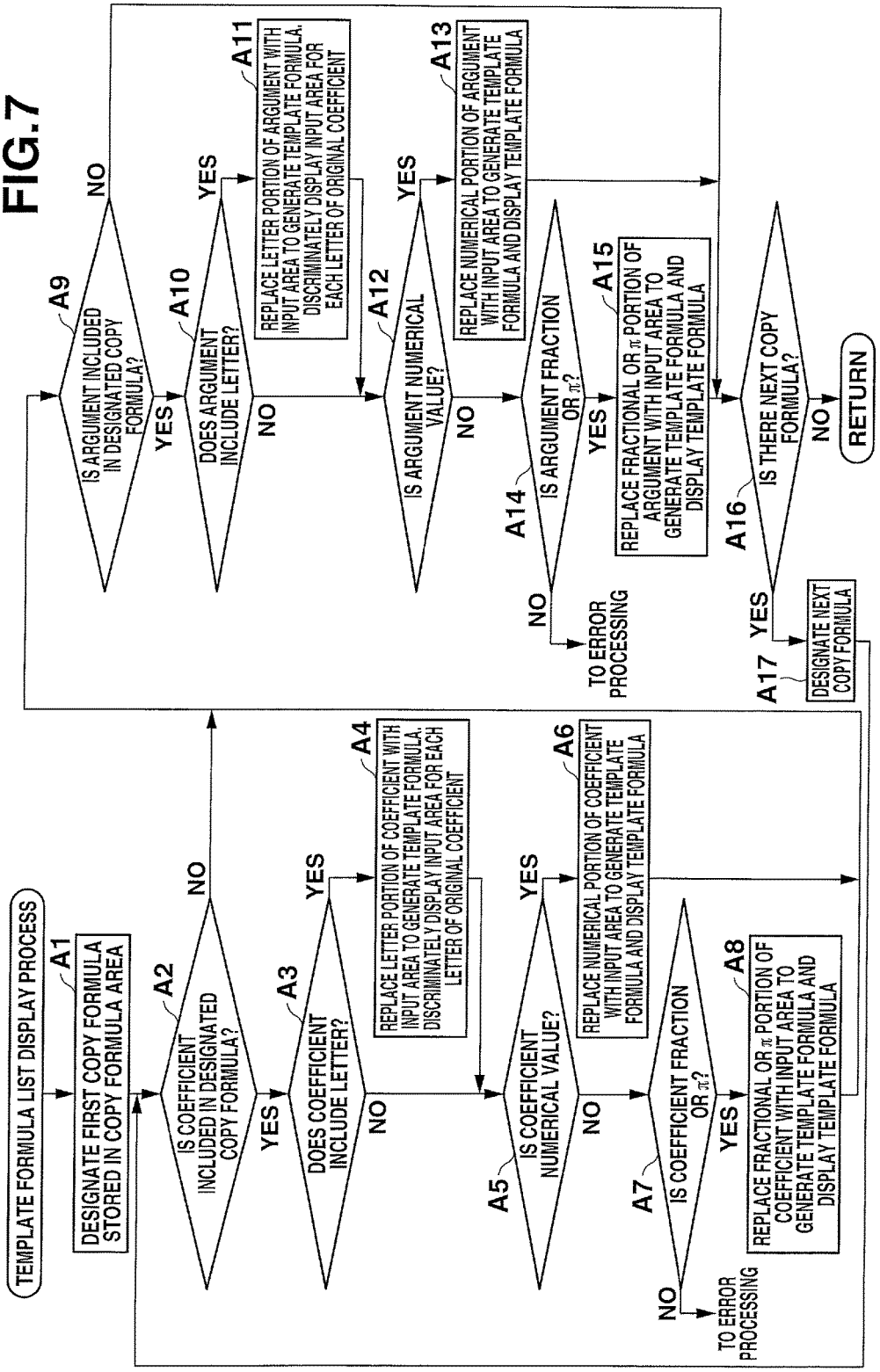
FIG. 7 is a flowchart illustrating a template formula list display process associated with the formula editing process of the scientific calculator 10.

FIG. 7 is a flowchart illustrating a template formula list display process associated with the formula editing process of the scientific calculator 10.

FIG. 8 is a diagram illustrating an example (1) of a display operation associated with the formula editing process of the scientific calculator 10.

Figure 8A:
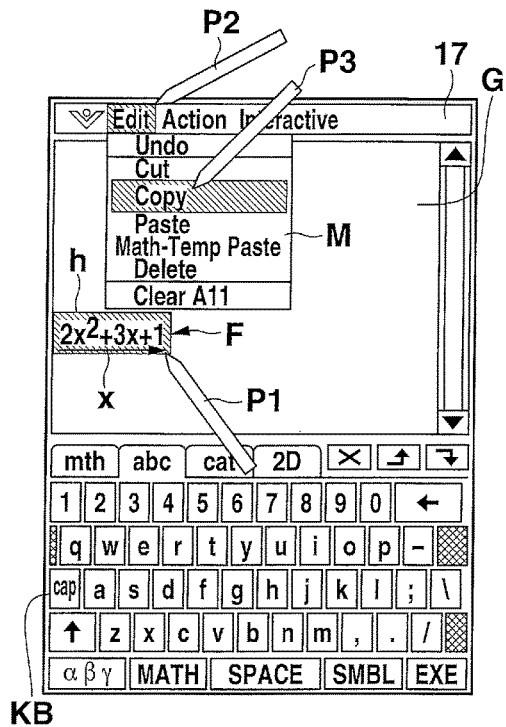
FIGS. 8A to 8D are diagrams illustrating an example (1) of a display operation associated with the formula editing process of the scientific calculator 10.

When the formula editing program 13a starts in response to the setting of an operation mode corresponding to the operation of the user, the formula display screen G is displayed in the upper half and the input keyboard KB is displayed in the lower half of the touch-panel-type color display unit 17, as shown in FIG. 8(A).

Text including an arbitrary formula F is read and displayed on the formula display screen G (Step S1). In this state, when the user designates a position in the displayed text (Step S2 (Yes)), an input cursor is displayed at the designated position (Step S3).

When a formula or the like is input in response to an operation for the input keyboard KB on the formula display screen G (Step S4 (Yes)), the input formula or the like is displayed according to the position of the input cursor on the formula display screen G (Step S5). The term "formula or the like" is not limited to a formula which can be displayed in a row, but includes a 2D (two-dimensional) function formula, such as a fractional function, a power function, or an integral function in which a numerical portion is expanded in the vertical direction, in the natural representation of a formula and letters, such as titles.

As shown in FIG. 8(A), a letter string (formula F $[2x^2+3x+1]$) displayed on the formula display screen G is designated in response to an operation of a user (P1) as a copy range as represented by an arrow X (Step S9 (Yes)), the designated copy range is highlighted (or a mark is added to the designated copy range) so as to be discriminately displayed (h) (Step S10).

Then, when a copy function [Copy] is designated (P3) from an edit menu M corresponding to the designation P2 of an edit symbol [Edit] and an execution key [EXE] is input (Step S11 (Yes)), the discriminately-displayed (h) copy range (formula F $[2x^2+3x+1]$) is copied and stored in the copy letter string area $12c$ (Step S12).

Then, it is determined whether a formula is included in a letter string in the copy range stored in the copy letter string area $12c$ (Step S13). When it is determined that the formula F $[2x^2+3x+1]$ is included (Step S13 (Yes)), the formula F $[2x^2+3x+1]$ is extracted from the letter string in the copy range and is then stored in the copy formula area $12d$ (Step S14).

Then, the discrimination display h of the copy range is cancelled (Step S15).

When the copy range is discriminately displayed (h) (Step S10), but the copy function is not designated on the formula display screen G (Step S11 (No)), the discrimination display h of the copy range is cancelled in response to the next operation of the user (Step S16)

When a formula is not included in the letter string in the copy range stored in the copy letter string area $12c$ (Step S13 (No)), the discrimination display h of the copy range is immediately cancelled (Step S15).

Then, when a general paste function [Paste] is designated (P3) from the edit menu M corresponding to the designation P2 of the edit symbol [Edit] and the execution key [EXE] is input (Step S17 (Yes)), a list of the letter strings in each copy range stored in the copy letter string area $12c$ is displayed on a paste window (not shown) (Step S18).

When any one of the letter strings in each copy range in the displayed list is selected by the operation of the user (Step S19), the selected letter string is displayed at a designated position on the formula display screen G (Step S20).

Figure 8B:
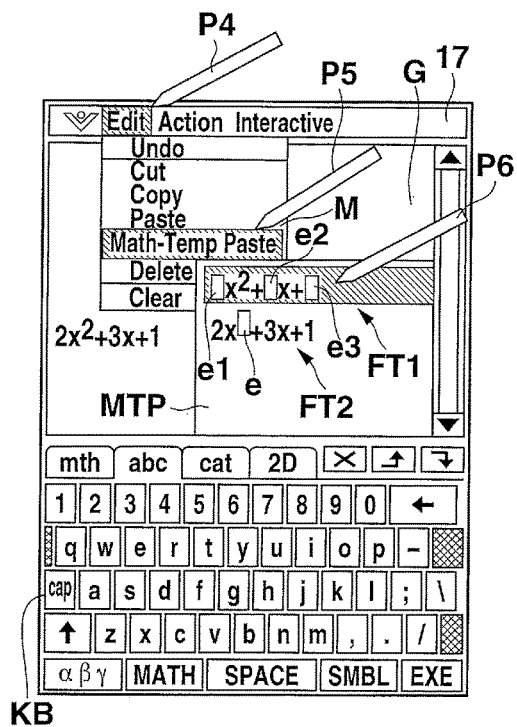

When a template formula paste function [Math-Template Paste] is designated (P5) from the edit menu M corresponding to the designation P4 of the edit symbol [Edit] as shown in FIG. 8(B), with the formula F $[2x^2+3x+1]$ copied and stored in the copy formula area $12d$ as shown in FIG. 8(A), and the execution key [EXE] is input (Step S21 (Yes)), the process proceeds to a template formula list display process shown in FIG. 7 (Step SA).

In the template formula list display process, the first formula F which is copied and stored in the copy formula area $12d$ is designated (Step A1) and it is determined whether a coefficient is included in the formula F (Step A2).

When it is determined that a coefficient is included in the designated formula F (Step A2 (Yes)), it is determined whether the coefficient includes a letter (Step A3).

When it is determined that the coefficient included in the designated formula F includes a letter (Step A3 (Yes)), a letter portion of the coefficient is replaced with the numerical value input frame e to generate a template formula FT and the template formula FT in which the numerical value input frame e has an identification color (see FIG. 3) corresponding to the letter of the coefficient is displayed on a template formula paste window MTP (Step A4).

When it is determined that the coefficients included in the designated formula F $[2x^2+3x+1]$ include numerical values (second-order coefficient "2", first-order coefficient "3", and zeroth-order coefficient "1") (Step A5 (Yes)), numerical portions of the coefficients are replaced with the numerical value input frames e1, e2, and e3 to generate a template formula FT1 $[\Box x^2+\Box x+\Box]$ and the template formula FT1 is displayed on the template formula paste window MTP (Step A6).

When it is determined that the coefficient included in the designated formula F includes a fraction or π (Step A7 (Yes)), the fraction or a π portion in the coefficient is replaced with the numerical value input frame e to generate a template formula FT and the template formula FT is displayed on the template formula paste window MTP (Step A8).

In addition, it is determined whether the designated formula F includes an argument (Step A9). When it is determined that the designated formula F includes an argument (Step A9 (Yes)), it is determined whether the argument includes a letter (Step A10).

When it is determined that the argument included in the formula F includes a letter (Step A10 (Yes)), a letter portion of the argument is replaced with the numerical value input frame e to generate a template formula FT and the template formula FT in which the numerical value input frame e has an identification color (see FIG. 3) corresponding to the letter in the argument is displayed on the template formula paste window MTP (Step A11).

When it is determined that the argument included in the designated formula F $[2x^2+3x+1]$ includes a numerical value (numerical value "2" of the power) (Step A12 (Yes)), a numerical portion of the argument is replaced with the numerical value input frame e to generate a template formula FT2 $[2x^\Box+3x+1]$ and the template formula FT2 is displayed on the template formula paste window MTP (Step A13).

When it is determined that the argument included in the designated formula F includes a fraction or π (Step A14 (Yes)), the fraction or a π portion in the argument is replaced with the numerical value input frame e to generate a template formula FT and the template formula FT is displayed on the template formula paste window MTP (Step A15).

Then, when it is determined that there is a formula F after the currently designated formula F among the formulas F which are copied and stored in the copy formula area $12d$ (Step A16 (Yes)), a homogeneous formula F is designated (Step A17) and the above-mentioned process of generating the template formula FT is repeated (Steps A2 to A15).

When it is determined that there is no formula F after the currently designated formula F among the formulas F which are copied and stored in the copy formula area $12d$ (Step A16 (No)), the series of template formula list display processes (Step SA) ends and the process returns to the formula editing step shown in FIG. 6.

Here, as shown in FIG. 8(B), two template formulas FT1 $[\Box x^2+\Box x+\Box]$ and FT2 $[2x^\Box+3x+1]$ are generated by the template formula list display process (Step SA) and a list thereof is displayed on the template formula paste window MTP. In this state, when the user selects (P6) any one (here, FT1) of the template formulas FTn (Step S22), the selected template formula FT1 $[\Box x^2+\Box x+\Box]$ is displayed at a designated position on the formula display screen G, as shown in FIG. 8(C) (Step S23).

At that time, when the numerical value input frame e in the template formula FTn selected by the template formula paste window MTP is the numerical value input frame e replaced from the letter portion and is displayed in an identification color corresponding to the letter, the template formula FTn in which the numerical value input frame e is displayed in the same identification color is displayed.

Figure 8C:
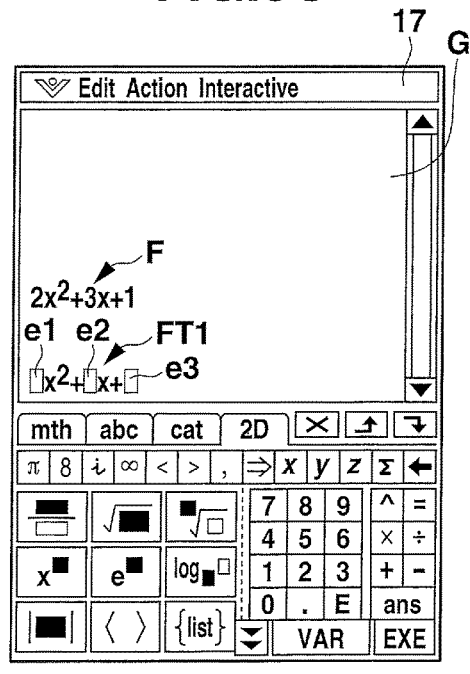
Figure 8D:
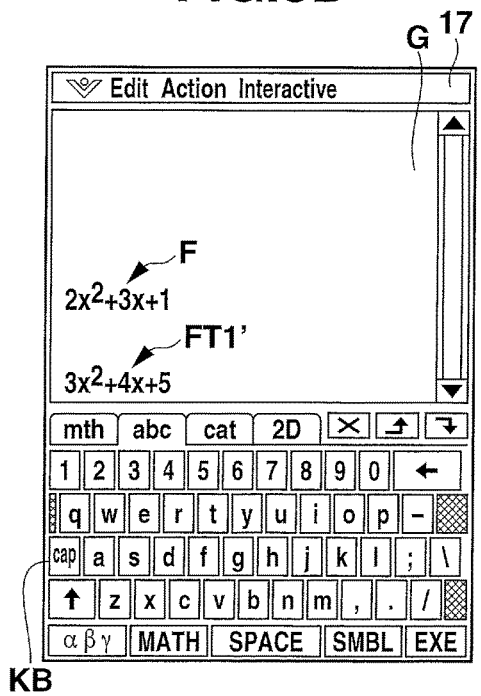

When the user inputs numerical values "3", "4", and "5" to the template formula FT1 [$\Box x^2+\Box x+\Box$] which is displayed at the designated position on the formula display screen G while sequentially touching and designating the numerical value input frames e1, e2, and e3 as shown in FIG. 8(C) (Step S4 (Yes)), it is possible to display a replacement formula FT1' obtained by simply replacing each coefficient included in the formula F [$2x^2+3x+1$], which is a copy source, with arbitrary numerical values, as shown in FIG. 8(D) (Step S5).

FIG. 9 is a diagram illustrating an example (2) of the display operation associated with the formula editing process of the scientific calculator 10.

Figure 9A:
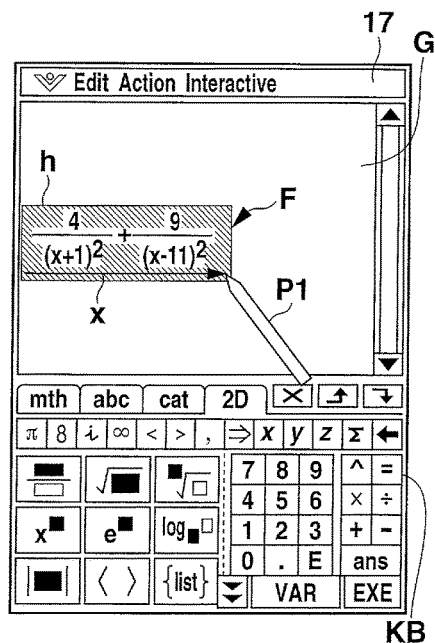
FIGS. 9A to 9D are diagrams illustrating an example (2) of the display operation associated with the formula editing process of the scientific calculator 10.

As shown in FIG. 9(A), a fractional formula F [$4/(x+1)^2+9/(x-11)^2$] is displayed on the formula display screen G (Steps S4 and S5). In this state, when the formula F is designated (P1) as a copy range as represented by an arrow X (Step S9 (Yes)), the designated copy range is highlighted (or a mark is added to the designated copy range) so as to be discriminately displayed (h) (Step S10).

Then, when the copy function [Copy] is designated from the edit menu M corresponding to the designation of the edit symbol [Edit] and the execution key [EXE] is input (Step S11 (Yes)), the discriminately-displayed (h) copy range (the formula F [$4/(x+1)^2+9/(x-11)^2$]) is copied and stored in the copy letter string area 12c (Step S12).

Then, the formula F [$4/(x+1)^2+9/(x-11)^2$] which is included in a letter string in the copy range stored in the copy letter string area 12c is extracted and stored in the copy formula area 12d (Steps S13 and S14).

Figure 9B:
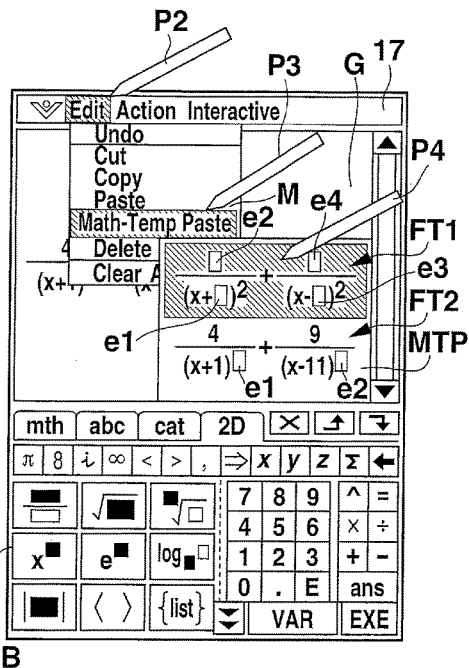

Then, when the template formula paste function [Math-Template Paste] is designated (P3) from the edit menu M corresponding to the designation P2 of the edit symbol [Edit] as shown in FIG. 9(B) and the execution key [EXE] is input (Step S21 (Yes)), the process proceeds to the template formula list display process shown in FIG. 7 (Step SA).

Then, the template formula list display process as described above is performed on the fractional formula F [$4/(x+1)^2+9/(x-11)^2$] stored in the copy formula area 12d and numerical portions of the coefficients included in the formula F (denominator "1" and numerator "4" of a fraction in the first term and denominator "11" and numerator "9" of a fraction in the second term) are replaced with the numerical value input frames e1, e2, e3, and e4 to generate a template formula FT1 [$\Box/(x+\Box)^2+\Box/(x-\Box)^2$]. The template formula FT1 is displayed on the template formula paste window MTP (Steps A1 to A5→A6).

Similarly, numerical portions of the arguments included in the formula F [$4/(x+1)^2+9/(x-11)^2$] (power "2" of the fraction in the first term and power "2" of the fraction in the second term) are replaced with the numerical value input frames e1 and e2 to generate a template formula FT2 [$4/(x+1)^\Box+9/(x-11)^\Box$] and a list of the template formulas is displayed on the template formula paste window MTP (Steps A9 to A12→A13).

Figure 9C:
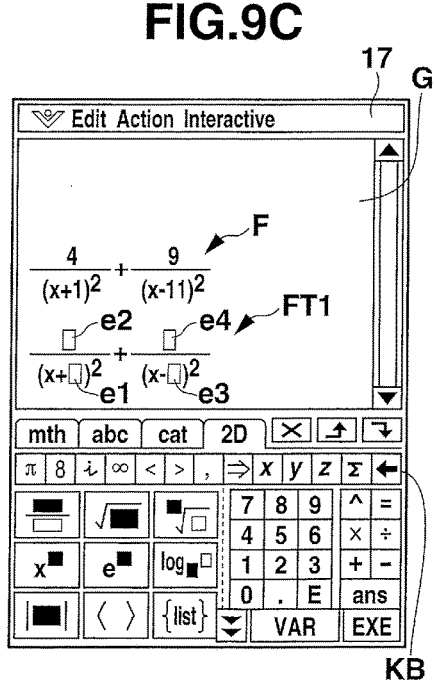

Here, as shown in FIG. 9(B), two template formulas FT1 [$\Box/(x+\Box)^2+\Box/(x-\Box)^2$] and FT2 [$4/(x+1)^\Box+9/(x-11)^\Box$] are generated and a list thereof is displayed on the template formula paste window MTP. In this state, when the user selects (P4) one (here, FT1) of the template formulas FTn (Step S22), the selected template formula FT1 [$\Box/(x+\Box)^2+\Box/(x-\Box)^2$] is displayed at a designated position on the formula display screen G, as shown in FIG. 9(C) (Step S23).

Figure 9D:
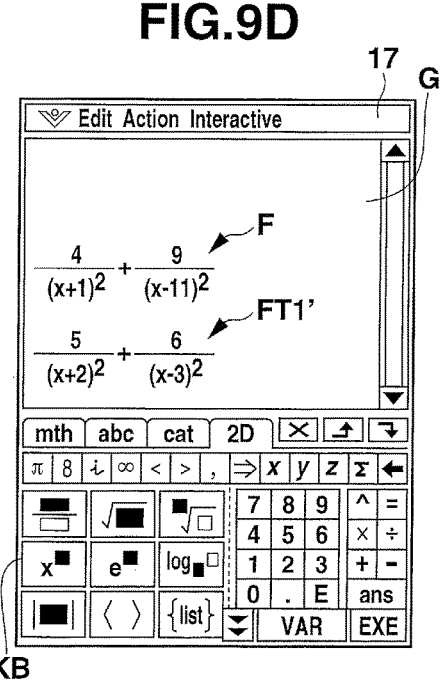

When the user inputs numerical values "2", "3", "5", and "6" to the template formula FT1 [$\Box/(x+\Box)^2+\Box/(x-\Box)^2$] which is displayed at the designated position on the formula display screen G while sequentially touching and designating the numerical value input frames e1, e2, e3, and e4 (Step S4 (Yes)), it is possible to display a replacement formula FT1' obtained by simply replacing each coefficient included in the formula F [$4/(x+1)^2+9/(x-11)^2$], which is a copy source, with arbitrary numerical values, as shown in FIG. 9(D) (Step S5).

FIG. 10 is a diagram illustrating an example (3) of the display operation associated with the formula editing process of the scientific calculator 10.

Figure 10A:
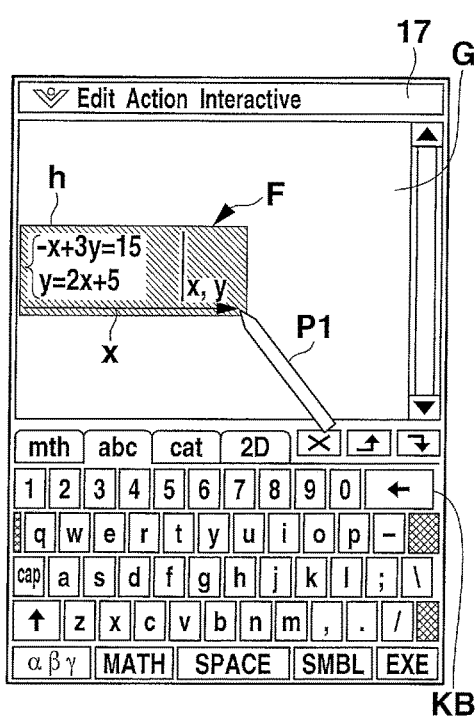
FIGS. 10A to 10D are diagrams illustrating an example (3) of the display operation associated with the formula editing process of the scientific calculator 10.

As shown in FIG. 10(A), a formula F [$-x+3y=15|y=2x+5|x, y$], which is a simultaneous equation, is displayed on the formula display screen G (Steps S4 and S5). In this state, when the formula F is designated (P1) in response to an operation of a user as a copy range as represented by an arrow X (Step S9 (Yes)), the designated copy range is highlighted (or a mark is added to the designated copy range) so as to be discriminately displayed (h) (Step S10).

Then, when the copy function [Copy] is designated from the edit menu M corresponding to the designation of the edit symbol [Edit] and the execution key [EXE] is input (Step S11 (Yes)), the discriminately-displayed (h) copy range (the formula F [$-x+3y=15|y=2x+5|x, y$]) is copied and stored in the copy letter string area 12c (Step S12).

Then, the formula F [$-x+3y=15|y=2x+5|x, y$] which is included in a letter string in the copy range stored in the copy letter string area 12c is extracted and stored in the copy formula area 12d (Steps S13 and S14).

Figure 10B:
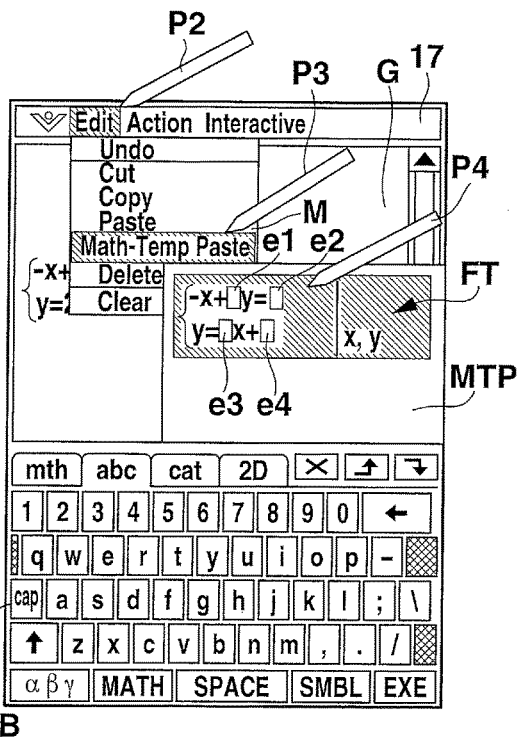

Then, when the template formula paste function [Math-Template Paste] is designated (P3) from the edit menu M corresponding to the designation P2 of the edit symbol [Edit] as shown in FIG. 10(B) and the execution key [EXE] is input (Step S21 (Yes)), the process proceeds to the template formula list display process shown in FIG. 7 (Step SA).

Then, the template formula list display process as described above is performed on the formula F [$-x+3y=15|y=2x+5|x, y$], which is the simultaneous equation stored in the copy formula area 12d, and numerical portions of coefficients included in the formula F (coefficients "3" and "15" in the first equation and coefficients "2" and "5" in the second equation) are replaced with the numerical value input frames e1, e2, e3, and e4 to generate a template formula FT [$-x+\Box y=\Box|y=\Box x+\Box|x, y$]. The template formula FT is displayed on the template formula paste window MTP (Steps A1 to A5→A6).

Figure 10C:
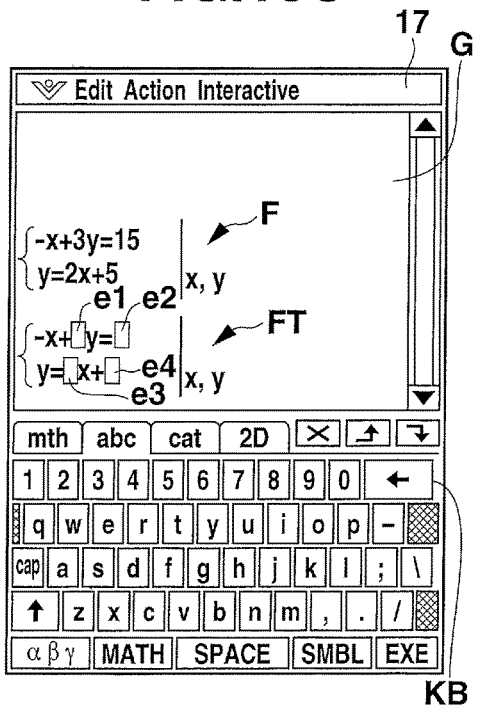
Figure 10D:
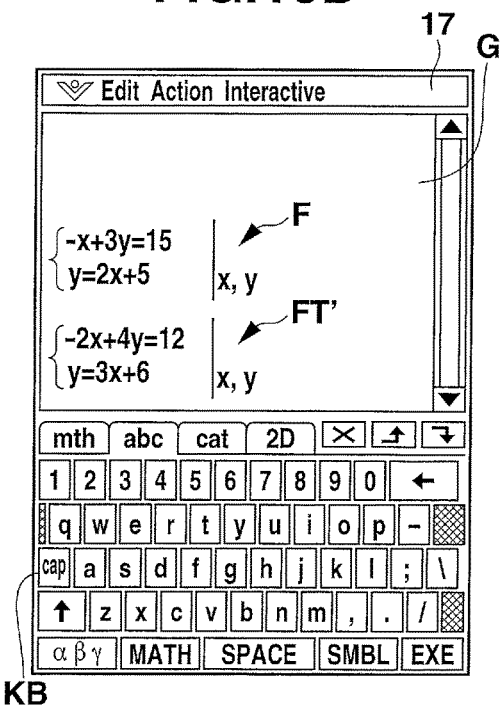

Here, as shown in FIG. 10(B), the template formula FT [$-x+\Box y=\Box|y=\Box x+\Box|x, y$] of the simultaneous equation is generated and displayed on the template formula paste window MTP. In this state, when the template formula FT is selected (P4) (Step S22), the selected template formula FT is displayed at a designated position on the formula display screen G, as shown in FIG. 10(C) (Step S23).

When the user inputs numerical values "2", "4", "3", and "6" to the template formula FT [$-x+\Box y=\Box|y=\Box x+\Box|x, y$] which is displayed at the designated position on the formula display screen G while sequentially touching and designating the numerical value input frames e1, e2, e3, and e4 (Step S4 (Yes)), it is possible to display a replacement formula FT' obtained by simply replacing each coefficient included in the formula F [−x+3y=15|y=2x+5|x, y], which is a copy source, with arbitrary numerical values (Step S5).

FIG. 11 is a diagram illustrating an example (4-1) of the display operation associated with the formula editing process of the scientific calculator 10.

FIG. 12 is a diagram illustrating an example (4-2) of the display operation associated with the formula editing process of the scientific calculator 10. FIG. 13 is a diagram illustrating an example (4-3) of the display operation associated with the formula editing process of the scientific calculator 10.

Figure 11A:
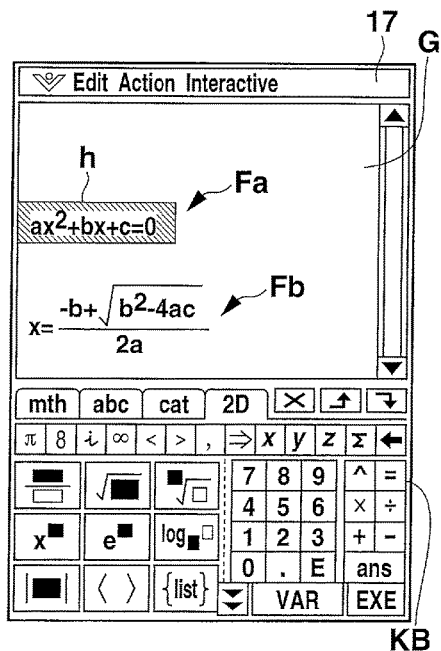
FIGS. 11A to 11D are diagrams illustrating an example (4-1) of the display operation associated with the formula editing process of the scientific calculator 10.
Figure 11B:
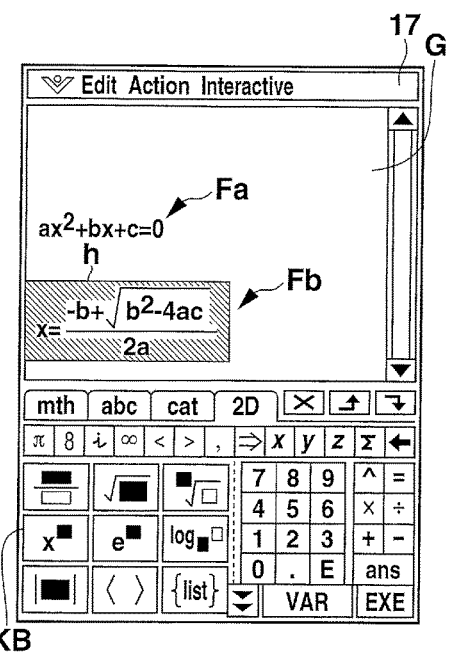

As shown in FIGS. 11(A) and 11(B), a formula Fa [$ax^2+bx+c=0$], which is a quadratic equation, and a formula Fb [$x=\{-b+\surd(b^2-4ac)\}/2a$], which is a solution for the quadratic equation, are displayed on the formula display screen G (Steps S4 and S5). In this state, the formulas Fa and Fb are sequentially designated as a copy range and are discriminately displayed (h) (Steps S9 and S10). When the copy function [Copy] is designated (Step S11 (Yes)), the formulas Fa and Fb which are included in a letter string of each of the discriminately displayed (h) copy ranges are extracted and stored in the copy formula area 12d (Steps S12, S13, and S14).

Figure 11C:
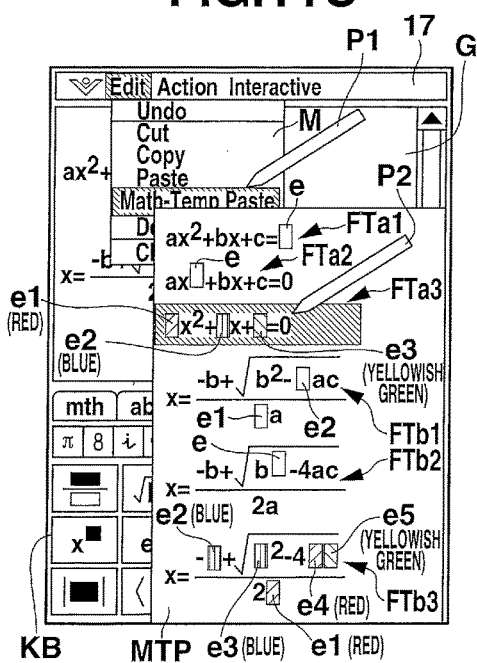

Then, as shown in FIG. 11(C), when the template formula paste function [Math-Template Paste] is designated (P1) from the edit menu M corresponding to the designation of the edit symbol [Edit] and the execution key [EXE] is input (Step S21 (Yes)), the process proceeds to the template formula list display process shown in FIG. 7 (Step SA).

Then, the template formula list display process as described above is performed on the formula Fa [$ax^2+bx+c=0$], which is the quadratic equation, and the formula Fb [$x=\{-b+\surd(b^2-4ac)\}/2a$], which is a solution for the quadratic equation, stored in the copy formula area 12d, and a numerical portion of the coefficient (zeroth-order coefficient "0") included in the first formula Fa, which is the quadratic equation, is replaced with the numerical value input frame e to generate a template formula FTa1 [$ax^2+bx+c=\square$]. The template formula FTa1 is displayed on the template formula paste window MTP (Steps A1 to A5→A6).

In addition, a numerical portion (numerical value "2" of the power) of an argument included in the first Fa [$ax^2+bx+c=0$], which is the quadratic equation, is replaced with the numerical value input frame e to generate a template formula FTa2 [$ax^\square+bx+c=0$]. The template formula FTa2 is displayed on the template formula paste window MTP (Steps A9 to A12→A13).

Furthermore, letter portions (letter "a" of the second-order coefficient, letter "b" of the first-order coefficient, and letter "c" of the zeroth-order coefficient) of the coefficients included in the first formula Fa [$ax^2+bx+c=0$], which is the quadratic equation, are replaced with the numerical value input frames e1, e2, and e3 to generate a template formula FTa3 [$\square x^2+\square x+\square=0$]. The template formulas FTa3 in which the numerical value input frames e1, e2, and e3 have identification colors (red), (blue), and (yellowish green) corresponding to the letters "a", "b", and "c" of the coefficients is displayed on the template formula paste window MTP (Steps A2, A3, and A4).

Then, the formula Fb [$x=\{-b+\surd(b^2-4ac)\}/2a$], which is a solution for the quadratic equation stored in the copy formula area 12d, is designated (Steps A16 and A17) and numerical portions (coefficient "2" of the denominator and coefficient "4" of the numerator) of the coefficients included in the formula Fb are replaced with the numerical value input frames e1 and e2 to generate a template formula FTb1 [$x=\{-b+\surd(b^2-\square ac)\}/\square a$]. The template formulas FTb1 is displayed on the template formula paste window MTP (Steps A1 to A5→A6).

In addition, a numerical portion (coefficient "2" of the power) of an argument included in the formula Fb [$x=\{-b+\surd(b^2-4ac)\}/2a$], which is the solution, is replaced with the numerical value input frame e to generate a template formula FTb2 [$x=\{-b+\surd(b^\square-4ac)\}/2a$]. The template formula FTb2 is displayed on the template formula paste window MTP (Steps A9 to A12→A13).

Furthermore, letter portions (letter "a" of the coefficient of the denominator and letters "b", "b", "a", and "c" of the coefficients of the numerator) of the coefficients included in the formula Fb [$x=\{-b+\surd(b^2-4ac)\}/2a$], which is the solution, are replaced with the numerical value input frames e1 to e5 to generate a template formula FTb3 [$x=\{-\square+\surd(\square^2-4\square\square)\}/2\square$]. The template formula FTb3 in which the numerical value input frames e1 to e5 have identification colors (red) (blue) (blue) (red), and (yellowish green) corresponding to the letters "a", "b", "b", "a", and "c" of the coefficients is displayed on the template formula paste window MTP (Steps A2, A3, and A4).

Figure 11D:
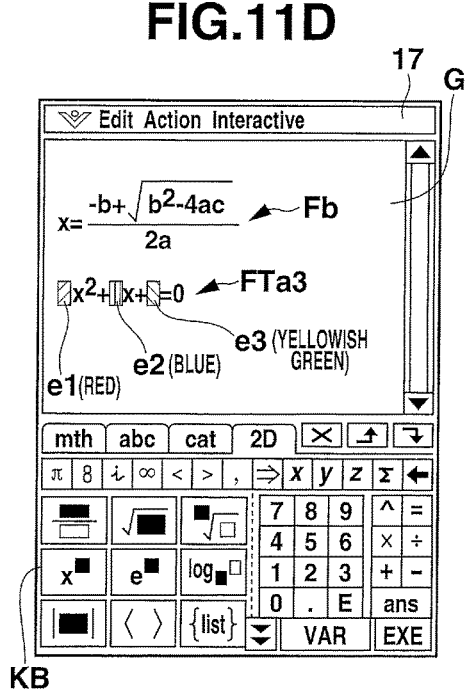

Here, as shown in the FIG. 11(C), the template formulas FTa1 [$ax^2+bx+c=\square$], FTa2 [$ax^\square+bx+c=0$], and FTa3 [$\square x^2+\square x+\square=0$] of the quadratic equation and the template formulas FTb1 [$x=\{-b+\surd(b^2-\square ac)\}/\square a$], FTb2 [$x=\{-b+\surd(b^\square-4ac)\}/2a$], and FTb3 [$x=\{-\square+\surd(\square^2-4\square\square)\}/2\square$] of the solution for the quadratic equation are generated and a list thereof is displayed on the template formula paste window MTP. In this state, when the template formula FTa3 obtained by replacing the letter portions of the coefficients in the quadratic equation with the numerical value input frames e1 to e3 is selected (P2) (Step S22), the selected template formula FTa3 [$\square x^2+\square x+\square=0$] is displayed at a designated position on the formula display screen G, as shown in FIG. 11(D) (Step S23).

Figure 12A:
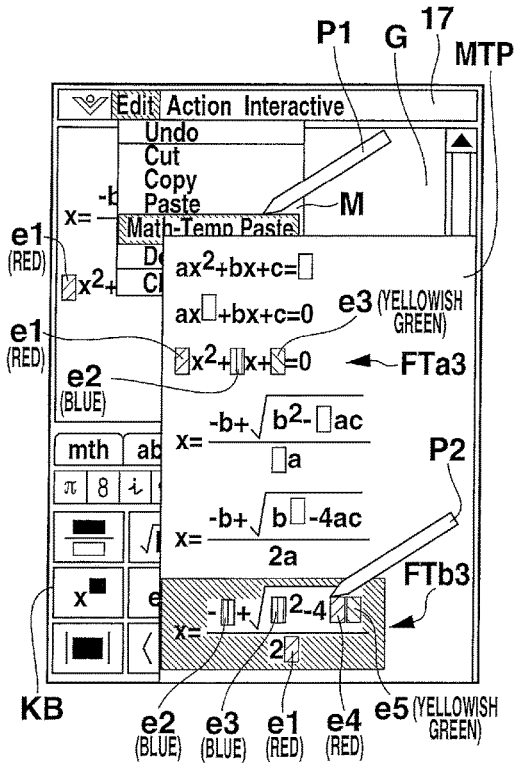
FIGS. 12A to 12D are diagrams illustrating an example (4-2) of the display operation associated with the formula editing process of the scientific calculator 10.
Figure 12B:
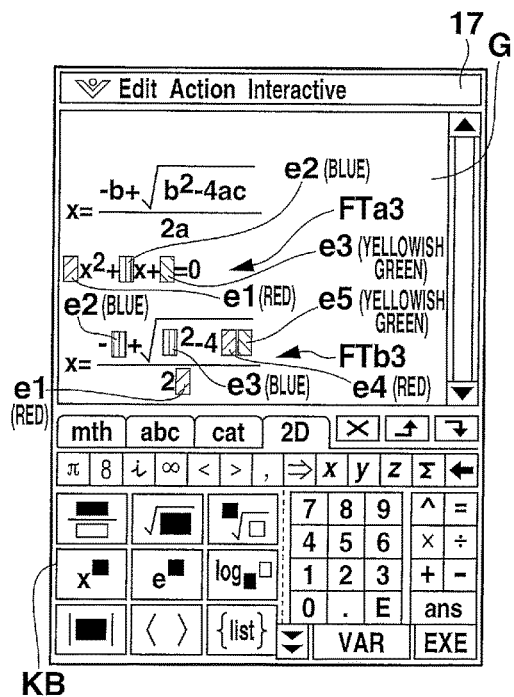

In addition, as shown in FIG. 12(A), when the template formula FTb3 obtained by replacing the letter portions of the coefficients in the formula, which is the solution, with the numerical value input frames e1 to e5 is selected (P2) (Step S22), the selected template formula FTb3 [$x=\{-\square+\surd(\square^2-4\square\square)\}/2\square$] is displayed at a designated position on the formula display screen G, as shown in FIG. 12(B) (Step S23).

Figure 12C:
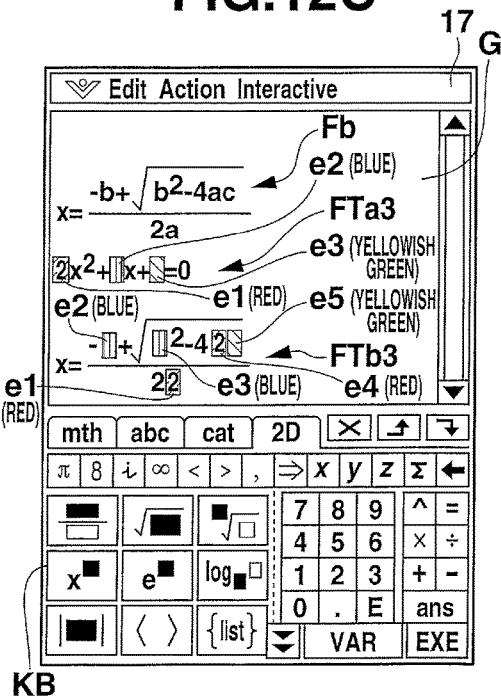

Then, first, as shown in FIG. 12(C), when the user touches and designates the numerical value input frame e1 which is discriminately displayed in (red) corresponding to letter "a" of the second-order coefficient and inputs numerical value "2" to the template formula FTa3 [$\square x^2+\square x+\square=0$] of the quadratic equation displayed on the formula display screen G (Steps S4 and S5), it is determined that the numerical value input frame e1 is an input frame corresponding to letter "a" (Step S6 (Yes)) and it is determined that the numerical value input frame e1 is displayed in an identification color (red) corresponding to letter "a" (Step S7 (Yes)).

Then, numerical value "2" is collectively input to the numerical value input frames e1 (red) and e4 (red) in the template formula FTb3 of the solution, which are displayed in the same identification color (red) as the numerical value input frame e1 (red) of coefficient "a" in the template formula FTa3 of the quadratic equation to which numerical value "2" is input, on the formula display screen G and is displayed (Step S8).

Figure 12D:
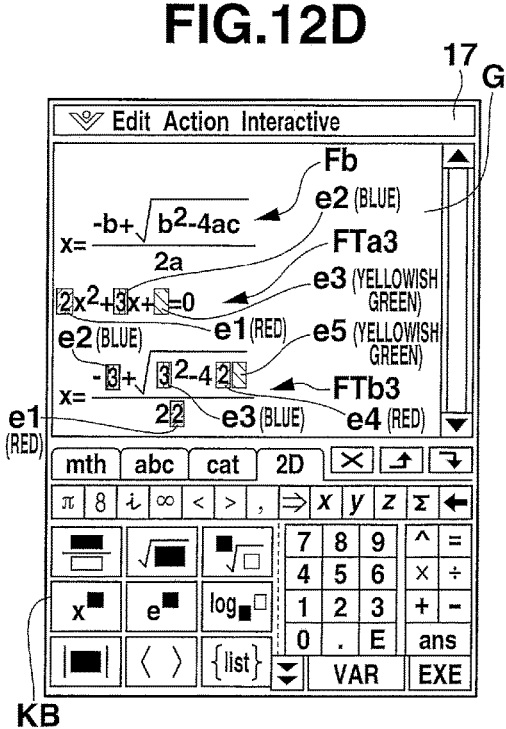

As shown in FIG. 12(D), when the user touches and designates the numerical value input frame e2 which is discriminately displayed in (blue) corresponding to letter "b" of the second-order coefficient and inputs numerical value "3" in the template formula FTa3 [$\Box x^2+\Box x+\Box=0$] of the quadratic equation displayed on the formula display screen G (Steps S4 and S5), it is determined that the numerical value input frame e2 is an input frame corresponding to letter "b" (Step S6 (Yes)) and it is determined that the numerical value input frame e2 is displayed in an identification color (blue) corresponding to letter "b" (Step S7 (Yes)).

Then, numerical value "3" is collectively input to the numerical value input frames e2 (blue) and e3 (blue) in the template formula FTb3 of the solution, which are displayed in the same identification color (blue) as the numerical value input frame e2 (blue) of coefficient "b" in the template formula FTa3 of the quadratic equation to which numerical value "3" is input, on the formula display screen G and is displayed (Step S8).

Figure 13A:
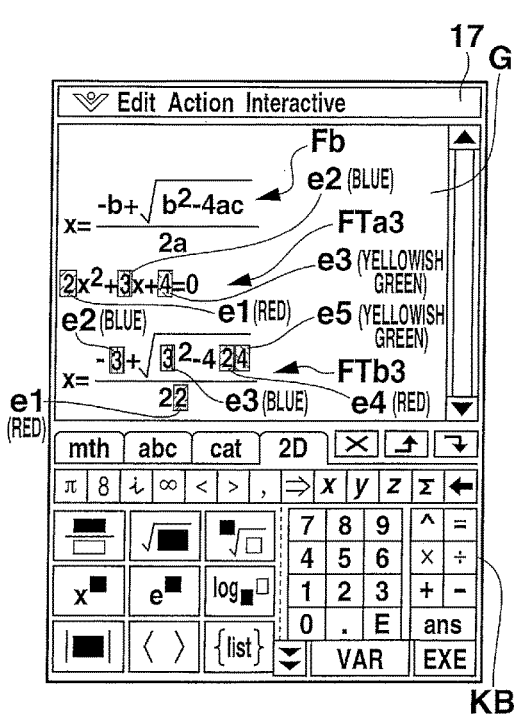
FIGS. 13A and 13B are diagrams illustrating an example (4-3) of the display operation associated with the formula editing process of the scientific calculator 10.

Similarly, as shown in FIG. 13(A), when the user touches and designates the numerical value input frame e3 which is discriminately displayed in (yellowish green) corresponding to letter "c" of the second-order coefficient and inputs numerical value "4" in the template formula FTa3 [$\Box x^2+\Box x+\Box=0$] of the quadratic equation displayed on the formula display screen G (Steps S4 and S5), it is determined that the numerical value input frame e3 is an input frame corresponding to letter "c" (Step S6 (Yes)) and it is determined that the numerical value input frame e3 is displayed in an identification color (yellowish green) corresponding to letter "c" (Step S7 (Yes)).

Then, numerical value "4" is collectively input to the numerical value input frame e5 (yellowish green) in the template formula FTb3 of the solution which is displayed in the same identification color (yellowish green) as the numerical value input frame e3 (yellowish green) of coefficient "c" in the template formula FTa3 of the quadratic equation to which numerical value "4" is input on the formula display screen G and is displayed (Step S8).

Therefore, when there are a plurality of numerical value input frames e(a) . . . , e(b) . . . , e(c) . . . that are replaced from the same letter in the template formulas FTa3 and FTb3 generated by copying the formulas Fa and Fb, for the letter portions of the coefficients of the formulas Fa and Fb, which are copy sources, the numerical value input frames e(a) . . . , e(b) . . . , e(c) . . . can be displayed in the same identification color e(red) . . . , e(blue) . . . , e(yellowish green) . . . . In addition, it is possible to collectively input the same numerical value to the numerical value input frames e . . . of the same color only by inputting a desired numerical value to any one of the numerical value input frames e . . . of the same letter displayed in the same identification color and to display the numerical values.

Figure 13B:
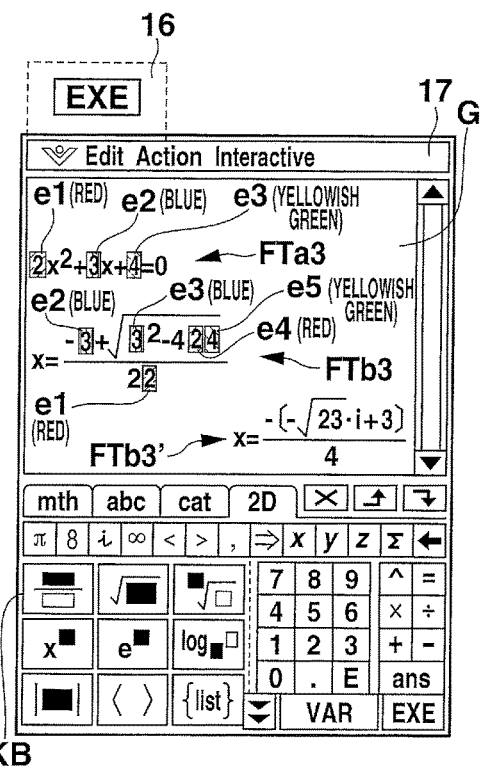
Figure 14A:
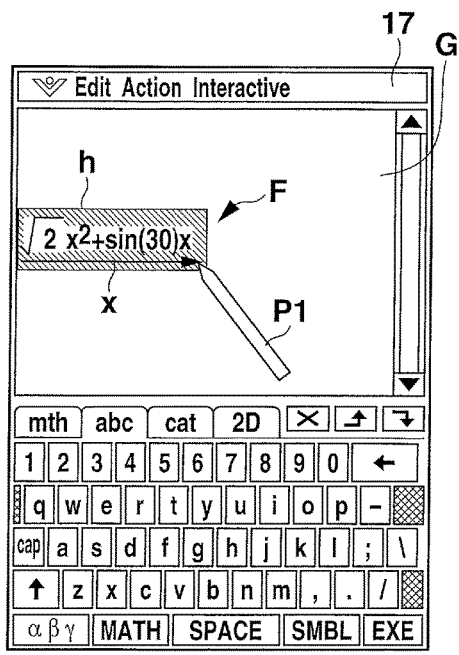
FIGS. 14A to 14D are diagrams illustrating an example of a display operation according to a modification example of the formula editing process of the scientific calculator 10.
Figure 14B:
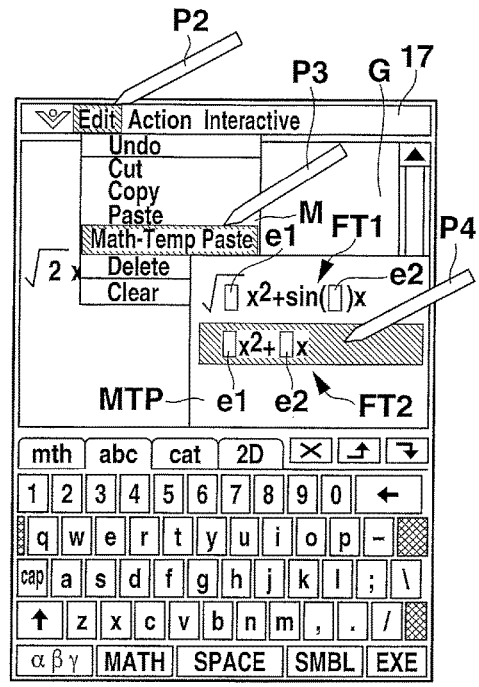
Figure 14C:
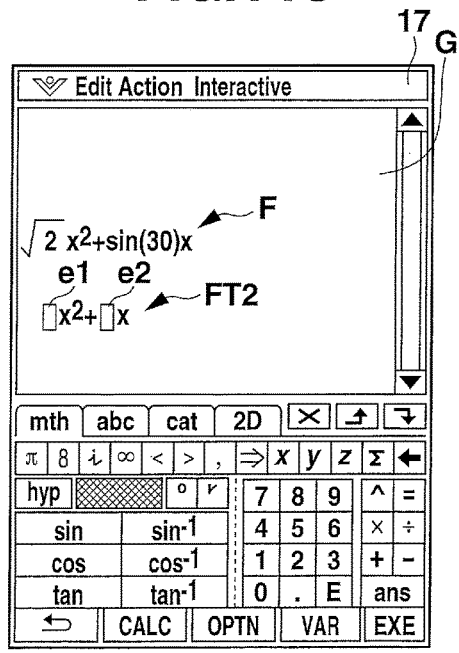
Figure 14D:
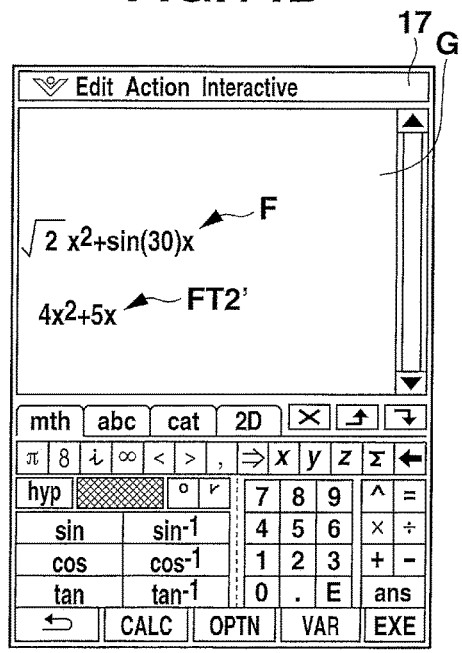

Therefore, as shown in FIG. 13(B), even when the template formula FTa3 obtained by replacing the letter portions of the coefficients in the quadratic equation and the template formula FTb3 of the solution for the quadratic equation are generated, it is possible to input very simply desired numerical values to each numerical value input frame of the template formulas FTa3 and FTb3 and to display the numerical values. It is possible to obtain a formula FTb3' of the calculation result easily.

In the embodiment, the template formula list display process (Step SA) is performed on the formula F, which is a copy source, to replace the letter and numerical portions of the coefficients and the letter and numerical portions of the arguments in the formula F with the numerical value input frames e, thereby generating the template formula FT.

In contrast, the invention may have the following structure which will be described with reference to FIG. 14. Only a numerical value calculation portion [$\sqrt{(2)}$] [sin(30)] included in a formula F [$\sqrt{(2)}x^2+\sin(30)x$], which is a copy source, is calculated in one stage. Then, the process proceeds to the template formula list display process (Step SA) again. The first template formula list display process is performed to replace a numerical portion (numerical value "2" of an argument in a root portion and numerical value "30" of an argument in a "sin" portion) with numerical value input frames e1 and e2, thereby generating a template formula FT1 [$\sqrt{(\Box)}x^2+\sin(\Box)x$]. In addition, after the numerical value calculation portion [$\sqrt{(2)}$] [sin(30)] is calculated, the next template formula list display process is performed to replace the numerical value calculation portion as a numerical portion of a coefficient with numerical value input frames e1 and e2, thereby generating a template formula FT2 [$\Box x^2+\Box x$].

FIG. 14 is a diagram illustrating an example of a display operation associated with a modification example of the formula editing process of the scientific calculator 10.

Therefore, according to the formula editing function of the scientific calculator 10 having the above-mentioned structure, when the user copies an arbitrary formula F which is displayed on the formula display screen G and designates the template formula paste function (Math-Temp Paste), a template formula FTn obtained by replacing a letter portion of a coefficient included in the copied formula F with a numerical value input frame e, a template formula FTn obtained by replacing a numerical portion of the coefficient with the numerical value input frame e, a template formula FTn obtained by replacing a letter portion of an argument with the numerical value input frame e, and a template formula FTn obtained by replacing a numerical portion of the argument with the numerical value input frame e are generated and a list thereof is displayed on the template formula paste window MTP. Then, when the user selects a desired formula from the list of the template formulas FTn, the selected template formula FTn is pasted and displayed at the position designated by the user on the formula display screen G. When the user inputs a desired numerical value to the numerical value input frame e in the template formula FTn, the numerical value is displayed and calculation can be performed.

Therefore, it is possible to simply generate the template formula FT with the same format as the formula F which is a copy source. In addition, a desired numerical value can be input to a numerical value as a parameter to learn and analyze the formula F. Therefore, it is possible to simply and effectively use the copied formula F.

According to the formula editing function of the scientific calculator 10 having the above-mentioned structure, when the letter portion of the coefficient included in the formula F, which is a copy source, is replaced with the numerical value input frame e to generate the template formula FT, the numerical value input frame e is discriminately displayed in a display color which is set in advance in correspondence with the letter which is a replacement source. Therefore, it is possible to easily recognize that the numerical value input frame e of the generated template formula FT is replaced from the letter portion of the coefficient. In addition, it is possible to easily recognize a plurality of numerical value input frames e . . . which are replaced in correspondence with the same letter.

In the case in which the numerical value input frames e that are replaced with the letter portions of the coefficients included in the formula F, which is a copy source, are present as a plurality of numerical value input frames e . . . that are replaced from the same letter and are discriminately displayed in the same color in the template formula FT, when the user inputs a desired numerical value to one of the numerical value input frames e, the same numerical value is also collectively and automatically input to the other numerical value input frames e of the same identification color. For example, when template formulas FTa and FTb of a quadratic equation Fa and a solution formula Fb for the quadratic equation Fa are generated, it is possible to input very easily the same numerical value to a plurality of numerical value input frames e . . . corresponding to the same letter portion of the coefficients and to perform learning and analysis.

The method of each process performed by the scientific calculator 10 described in each embodiment, that is, the formula editing process (part 1) shown in the flowchart of FIG. 5, the formula editing process (part 2) shown in the flowchart of FIG. 6, and the template formula list display process shown in the flowchart of FIG. 7, can be stored as a program which causes a computer to perform all of the processes in an external storage medium 13, such as a memory card (for example, a ROM card or a RAM card), a magnetic disk (for example, a floppy disk or a hard disk), an optical disk (for example, a CD-ROM or a DVD), or a semiconductor memory and then distributed. A computer of an electronic apparatus including the touch-panel-type color display unit (17) can read the program stored in the external storage medium 13 to a storage device (12) and the operation thereof can be controlled by the read program to implement a template formula generation function associated with the formula editing process described in each embodiment. The computer can perform the same processes using the above-mentioned method.

In addition, data of the program for implementing each of the above-mentioned methods can be transmitted in the form of program codes on a network N and a computer of an electronic apparatus including the touch-panel-type color display unit (17) connected to the network N can receive the program through the communication unit 15 and can implement the template formula generation function associated with the formula editing process.

The invention is not limited to each of the above-described embodiments, but various modifications and changes of the invention can be made without departing from the scope and spirit of the invention in an execution phase. In addition, each of the above-described embodiments includes structures in various stages and a plurality of disclosed components can be appropriately combined with each other to form various structures. For example, even when some of the components according to each embodiment are removed or some of the components are combined in different forms, structures in which the components are removed or combined with each other are included in the scope of the invention as long as the problems described in "Problem that the Invention is to Solve" are solved and the effect described in "Advantage of the Invention" is obtained.

What is claimed is:

1. A formula display control device comprising:
a display; and
a processor,
wherein the processor is configured to:
  display text including a formula on the display;
  designate the formula in the text displayed on the display in response to a user operation;
  replace a coefficient included in the formula with an input frame to generate a template formula when a coefficient is included in the designated formula;
  display, on the display, the template formula generated by replacing the coefficient included in the formula with the input frame;
  replace an argument included in the formula with the input frame to generate a template formula when an argument is included in the designated formula;
  display the template formula generated by replacing the argument included in the formula with the input frame, on the display, in response to a user operation;
  display, on the display, a list including (i) the template formula which is generated by replacing the coefficient included in the formula with the input frame, and (ii) the template formula which is generated by replacing the argument included in the formula with the input frame; and
  select an arbitrary template formula from the list of the template formulas, in response to a user operation,
wherein the displaying of the template formula generated by replacing the coefficient included in the formula with the input frame includes displaying, on the display, the selected template formula, which is obtained by replacing the coefficient included in the formula with the input frame, and
wherein the displaying of the template formula generated by replacing the argument included in the formula with the input frame includes displaying, on the display, the selected template formula, which is obtained by replacing the argument included in the formula with the input frame.

2. The formula display control device according to claim 1, wherein the processor is further configured to:
determine whether the coefficient is included in the designated formula,
wherein the displaying of the template formula generated by replacing the coefficient included in the formula with the input frame includes, when the coefficient is determined to be included in the designated formula, replacing the coefficient included in the formula with the input frame to generate the template formula.

3. The formula display control device according to claim 1, wherein the processor is further configured to:
determine whether the argument is included in the designated formula,
wherein the displaying of the template formula generated by replacing the argument included in the formula with the input frame includes, when the argument is determined to be included in the designated formula, replacing the argument included in the formula with the input frame to generate the template formula.

4. The formula display control device according to claim 1, wherein the processor is further configured to:
designate an input position of the selected template formula in the text displayed on the display,
wherein the displaying of the template formula generated by replacing the coefficient included in the formula with the input frame includes pasting and displaying the template formula which is selected and which is obtained by replacing the coefficient included in the formula with the input frame, at the designated input position in the text displayed on the display, and
wherein the displaying of the template formula generated by replacing the argument included in the formula with the input frame includes pasting and displaying the template formula which is selected and which is obtained by replacing the argument included in the formula with the input frame, at the designated input position in the text displayed on the display.

5. A formula display control device comprising:
a display; and
a processor,
wherein the processor is configured to:
- display text including a formula on the display;
- designate the formula in the text displayed on the display in response to a user operation;
- replace a coefficient included in the formula with an input frame to generate a template formula when a coefficient is included in the designated formula;
- display, on the display, the template formula generated by replacing the coefficient included in the formula with the input frame; and
- set an identification color corresponding to a letter, which is a replacement source, to the input frame, when the generated template formula is a template formula obtained by replacing a letter of the coefficient included in the formula with the input frame,
wherein the displaying of the template formula generated by replacing the coefficient included in the formula with the input frame includes displaying the template formula, which is generated to replace the letter of the coefficient included in the formula with the input frame, on the display such that the input frame has the set identification color.

6. The formula display control device according to claim 5, wherein the processor is further configured to:
- designate the input frame of the template formula displayed on the display;
- input a numerical value, in response to a user operation; and
- input the same numerical value of the input frame to another input frame which is displayed in the same identification color when the input frame with the input numerical value is an input frame displayed with the identification color corresponding to the letter, which is the replacement source of the input frame.

7. A formula display method in a computer including a display, the method comprising:
- displaying text including a formula on the display;
- designating the formula in the text displayed on the display in response to a user operation;
- replacing a coefficient included in the formula with an input frame to generate a template formula when a coefficient is included in the designated formula;
- displaying, on the display, the template formula generated by replacing the coefficient included in the formula with the input frame;
- replacing an argument included in the formula with the input frame to generate a template formula when an argument is included in the designated formula;
- displaying the template formula generated by replacing the argument included in the formula with the input frame, on the display, in response to a user operation;
- displaying, on the display, a list including (i) the template formula which is generated by replacing the coefficient included in the formula with the input frame, and (ii) the template formula which is generated by replacing the argument included in the formula with the input frame; and
- selecting an arbitrary template formula from the list of the template formulas, in response to a user operation,
wherein the displaying of the template formula generated by replacing the coefficient included in the formula with the input frame includes displaying, on the display, the selected template formula, which is obtained by replacing the coefficient included in the formula with the input frame, and
wherein the displaying of the template formula generated by replacing the argument included in the formula with the input frame includes displaying, on the display, the selected template formula, which is obtained by replacing the argument included in the formula with the input frame.

8. The method according to claim 7, further comprising:
determining whether the coefficient is included in the designated formula,
wherein the displaying of the template formula generated by replacing the coefficient included in the formula with the input frame includes, when the coefficient is determined to be included in the designated formula, replacing the coefficient included in the formula with the input frame to generate the template formula.

9. The method according to claim 7, further comprising:
determining whether the argument is included in the designated formula,
wherein the displaying of the template formula generated by replacing the argument included in the formula with the input frame includes, when the argument is determined to be included in the designated formula, replacing the argument included in the formula with the input frame to generate the template formula.

10. The method according to claim 7, further comprising:
designating an input position of the selected template formula in the text displayed on the display,
wherein the displaying of the template formula generated by replacing the coefficient included in the formula with the input frame includes pasting and displaying the template formula which is selected and which is obtained by replacing the coefficient included in the formula with the input frame, at the designated input position in the text displayed on the display, and
wherein the displaying of the template formula generated by replacing the argument included in the formula with the input frame includes pasting and displaying the template formula which is selected and which is obtained by replacing the argument included in the formula with the input frame, at the designated input position in the text displayed on the display.

11. A formula display method in a computer including a display, the method comprising:
- displaying text including a formula on the display;
- designating the formula in the text displayed on the display in response to a user operation;
- replacing a coefficient included in the formula with an input frame to generate a template formula when a coefficient is included in the designated formula;
- displaying, on the display, the template formula generated by replacing the coefficient included in the formula with the input frame; and
- setting an identification color corresponding to a letter, which is a replacement source, to the input frame, when the generated template formula is a template formula obtained by replacing a letter of the coefficient included in the formula with the input frame,
wherein the displaying of the template formula generated by replacing the coefficient included in the formula with the input frame includes displaying the template formula, which is generated to replace the letter of the coefficient included in the formula with the input frame, on the display such that the input frame has the set identification color.

12. The method according to claim 11, further comprising:
designating the input frame of the template formula displayed on the display;
inputting a numerical value, in response to a user operation; and
inputting the same numerical value of the input frame to another input frame which is displayed in the same identification color when the input frame with the input numerical value is an input frame displayed with the identification color corresponding to the letter, which is the replacement source of the input frame.

13. A non-transitory recording medium storing a computer-readable program for controlling a computer of an electronic apparatus including a display, the program controlling the computer to:
display text including a formula on the display;
designate the formula in the text displayed on the display in response to a user operation;
replace a coefficient included in the formula with an input frame to generate a template formula when a coefficient is included in the designated formula;
display, on the display, the template formula generated by replacing the coefficient included in the formula with the input frame;
replace an argument included in the formula with the input frame to generate a template formula when an argument is included in the designated formula;
display the template formula generated by replacing the argument included in the formula with the input frame, on the display, in response to a user operation;
display, on the display, a list including (i) the template formula which is generated by replacing the coefficient included in the formula with the input frame, and (ii) the template formula which is generated by replacing the argument included in the formula with the input frame; and
select an arbitrary template formula from the list of the template formulas, in response to a user operation,
wherein the displaying of the template formula generated by replacing the coefficient included in the formula with the input frame includes displaying, on the display, the selected template formula, which is obtained by replacing the coefficient included in the formula with the input frame, and
wherein the displaying of the template formula generated by replacing the argument included in the formula with the input frame includes displaying, on the display, the selected template formula, which is obtained by replacing the argument included in the formula with the input frame.

14. The non-transitory recording medium according to claim 13, wherein the program further controls the computer to:
determine whether the coefficient is included in the designated formula,
wherein the displaying of the template formula generated by replacing the coefficient included in the formula with the input frame includes, when the coefficient is determined to be included in the designated formula, replacing the coefficient included in the formula with the input frame to generate the template formula.

15. The non-transitory recording medium according to claim 13, wherein the program further controls the computer to:
determine whether the argument is included in the designated formula,
wherein the displaying of the template formula generated by replacing the argument included in the formula with the input frame includes, when the argument is determined to be included in the designated formula, replacing the argument included in the formula with the input frame to generate the template formula.

16. The non-transitory recording medium according to claim 13, wherein the program further controls the computer to:
designate an input position of the selected template formula in the text displayed on the display,
wherein the displaying of the template formula generated by replacing the coefficient included in the formula with the input frame includes pasting and displaying the template formula which is selected and which is obtained by replacing the coefficient included in the formula with the input frame, at the designated input position in the text displayed on the display, and
wherein the displaying of the template formula generated by replacing the argument included in the formula with the input frame includes pasting and displaying the template formula which is selected and which is obtained by replacing the argument included in the formula with the input frame, at the designated input position in the text displayed on the display.

17. A non-transitory recording medium storing a computer-readable program for controlling a computer of an electronic apparatus including a display, the program controlling the computer to:
display text including a formula on the display;
designate the formula in the text displayed on the display in response to a user operation;
replace a coefficient included in the formula with an input frame to generate a template formula when a coefficient is included in the designated formula;
display, on the display, the template formula generated by replacing the coefficient included in the formula with the input frame; and
set an identification color corresponding to a letter, which is a replacement source, to the input frame, when the generated template formula is a template formula obtained by replacing a letter of the coefficient included in the formula with the input frame,
wherein the displaying of the template formula generated by replacing the coefficient included in the formula with the input frame includes displaying the template formula, which is generated to replace the letter of the coefficient included in the formula with the input frame, on the display such that the input frame has the set identification color.

18. The non-transitory recording medium according to claim 17, wherein the program further controls the computer to:
designate the input frame of the template formula displayed on the display;
input a numerical value, in response to a user operation; and
input the same numerical value of the input frame to another input frame which is displayed in the same identification color when the input frame with the input numerical value is an input frame displayed with the identification color corresponding to the letter, which is the replacement source of the input frame.

* * * * *